(12) United States Patent
Hammond et al.

(10) Patent No.: US 9,294,601 B2
(45) Date of Patent: Mar. 22, 2016

(54) ILLUMINATED CELL PHONE CASE

(76) Inventors: Alexander H Hammond, Warrenton, VA (US); Robert Francis Kerr, Jr., Warrenton, VA (US)

( * ) Notice: Subject to any disclaimer, the term of this patent is extended or adjusted under 35 U.S.C. 154(b) by 709 days.

(21) Appl. No.: 13/478,773

(22) Filed: May 23, 2012

(65) Prior Publication Data
US 2012/0302294 A1    Nov. 29, 2012

Related U.S. Application Data

(60) Provisional application No. 61/489,195, filed on May 23, 2011, provisional application No. 61/502,434, filed on Jun. 29, 2011.

(51) Int. Cl.
*H04M 1/18* (2006.01)
*H04M 1/22* (2006.01)
*H04M 1/725* (2006.01)

(52) U.S. Cl.
CPC . *H04M 1/18* (2013.01); *H04M 1/22* (2013.01); *H04M 1/72527* (2013.01)

(58) Field of Classification Search
CPC ....... H04M 1/0283; H04M 1/22; H04M 1/18; H04M 1/72527

USPC .................... 455/567, 575.1, 575.8
See application file for complete search history.

(56) References Cited

U.S. PATENT DOCUMENTS

| | | | |
|---|---|---|---|
| 2011/0195753 A1* | 8/2011 | Mock et al. | 455/566 |
| 2012/0077548 A1* | 3/2012 | Goldberg | 455/567 |
| 2012/0244918 A1* | 9/2012 | Hall | 455/575.4 |

* cited by examiner

*Primary Examiner* — George Eng
*Assistant Examiner* — Marcus Hammonds
(74) *Attorney, Agent, or Firm* — Michael Ries

(57) ABSTRACT

An illuminated cell phone case that includes a one piece bumper that surrounds a perimeter of a cell phone, illuminated indicia that is disposed on a back portion of the illuminating cell phone case and a LED, PCB and battery assembly. The illuminating cell phone case includes one or more programmable microprocessors that controls a plurality of LED lights, LCD Screens, LED Screens, a motion sensing chip, an audio detection sensor microphone, electronic microprocessor switches that activates electronic components powered by a battery that provides power to the illuminating cellphone case.

20 Claims, 5 Drawing Sheets

ILLUMINATED CELL PHONE CASE

This application claims priority to U.S. Provisional Application 61/489,195 filed on May 23, 2011, the entire disclosure of which is incorporated by reference. U.S. Provisional Application 61/502,434 filed on Jun. 29, 2011, the entire disclosure of which is incorporated by reference.

TECHNICAL FIELD & BACKGROUND

A cell phone user does not need to have the ringer turned on to know when there is an incoming call, text or e-mail. There are no lighted cell phone cases that light-up to identify an incoming call, text or e-mail with a plurality of LED style light arrays or one or more LED or LCD screen displays.

The present invention generally relates to a cellphone case. More specifically, the invention is an illuminated cell phone case.

It is an object of the invention to provide an illuminated cell phone case that is programmed to control a plurality of lights, screens and sounds to indicate when there is an incoming call, text or e-mail.

It is an object of the invention to provide an illuminated cell phone case that utilizes user friendly software that allows users to select various programmable customized lights, LED, LCD and audio functions, which provide customized combinations of silent visual displays and audible alerts as desired to draw attention to the cellphone case.

It is an object of the invention to provide an illuminated cell phone case that suitably protects a cellphone from damages.

What is really needed is an illuminated cell phone case that is programmed to control a plurality of LED lights, one or more LED or LCD screen displays and sounds to indicate when there is an incoming call, text or e-mail that utilizes user friendly software that allows users to select various programmable customized lights, LED, LCD and audio functions, which provide customized combinations of silent visual displays and audible alerts as desired to draw attention to the cellphone case that suitably protects a cellphone from damages.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
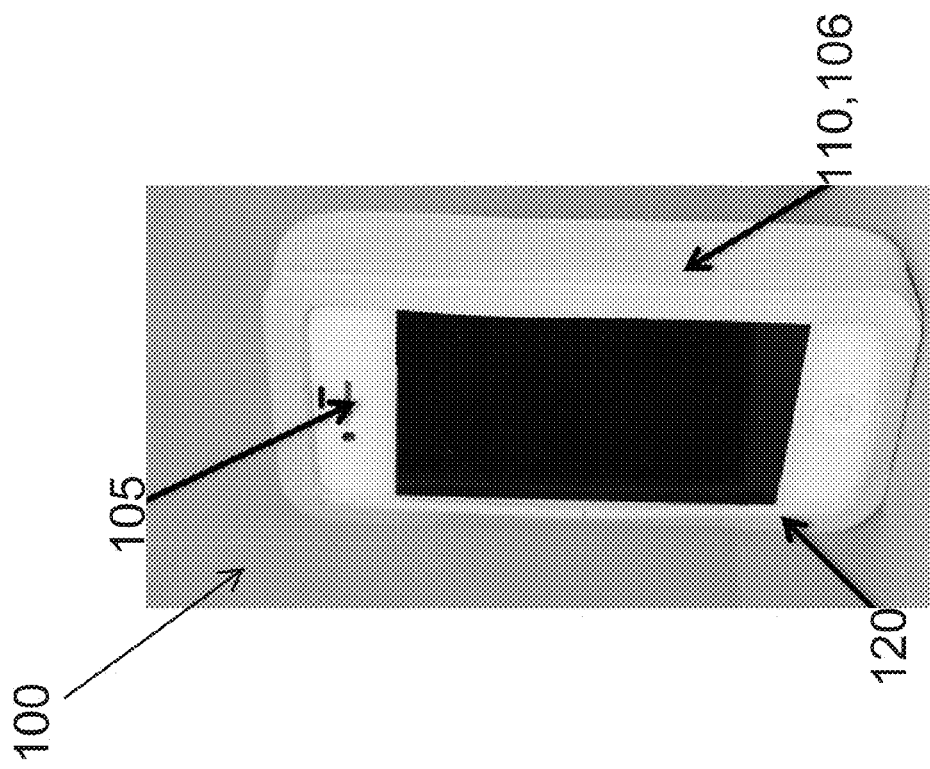
FIG. 1A illustrates a front perspective view of an illuminated cell phone case, in accordance with one embodiment of the present invention.

FIG. 1A illustrates a front perspective view of an illuminated cell phone case 100, in accordance with one embodiment of the present invention.

The illuminated cell phone case 100 illustrated in FIG. 1A encases an IPHONE™ cell phone 105, but the illuminated cellphone case 100 can encase any other suitable cell phone 105, tablet computer or other suitable mobile device (not shown).

The illuminated cell phone case 100 includes a one piece bumper 110 and a front flange 120. The one piece bumper 110 surrounds a perimeter 106 of the cell phone 105 and protects the cell phone 105 from damage. The one piece bumper 110 is made of injection molded silicone but can be made of other suitable material as well. The front flange 120 is similar to the one piece bumper 110 to provide front and rear protection to the cell phone 105. The one piece bumper 110 and the front flange 120 is made of injection molded silicone but can be made of other suitable material as well.

Figure 1B:
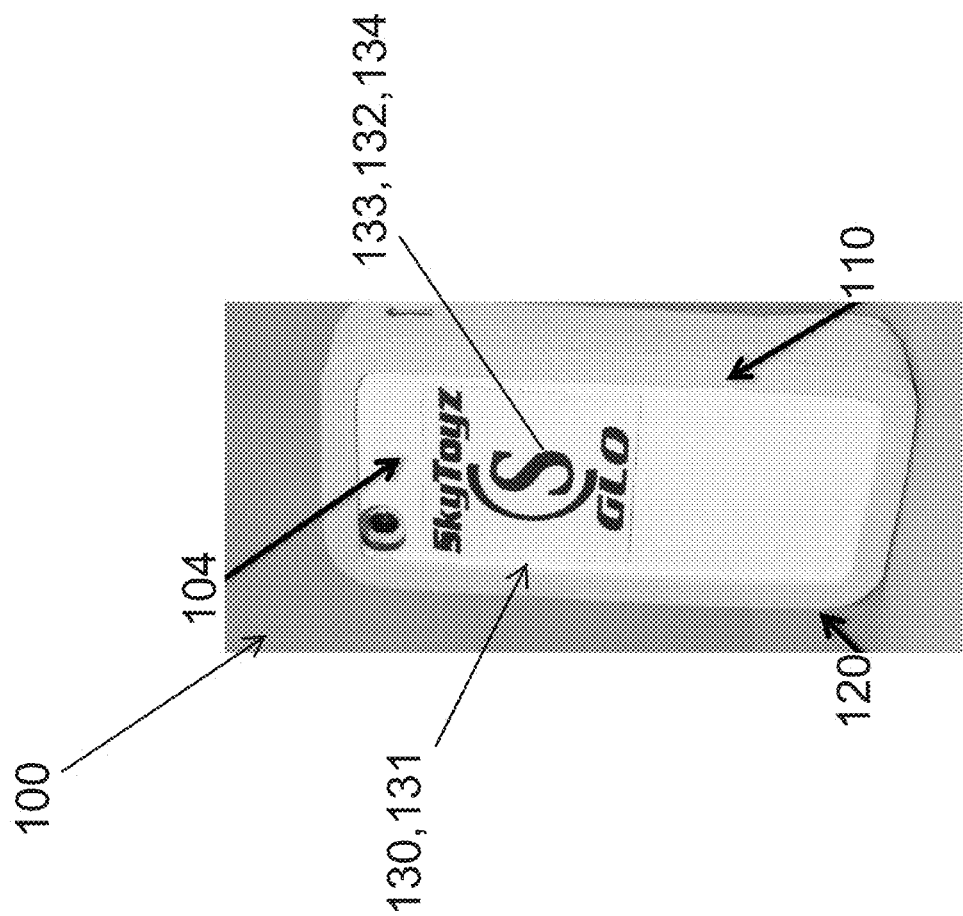
FIG. 1B illustrates a rear perspective view of an illuminated cell phone case, in accordance with one embodiment of the present invention.

FIG. 1B illustrates a rear perspective view of an illuminated cell phone case 100, in accordance with one embodiment of the present invention.

The illuminated cell phone case 100 also includes one or more LCD screens 130 or one or more LED screens 131, an illuminated indicia 133 that is disposed on a back portion 104 of the illuminated cell phone case 100. The illuminated indicia 133 can be a logo 132 such as a company logo 134 or any other suitable illuminated indicia.

Figure 1C:
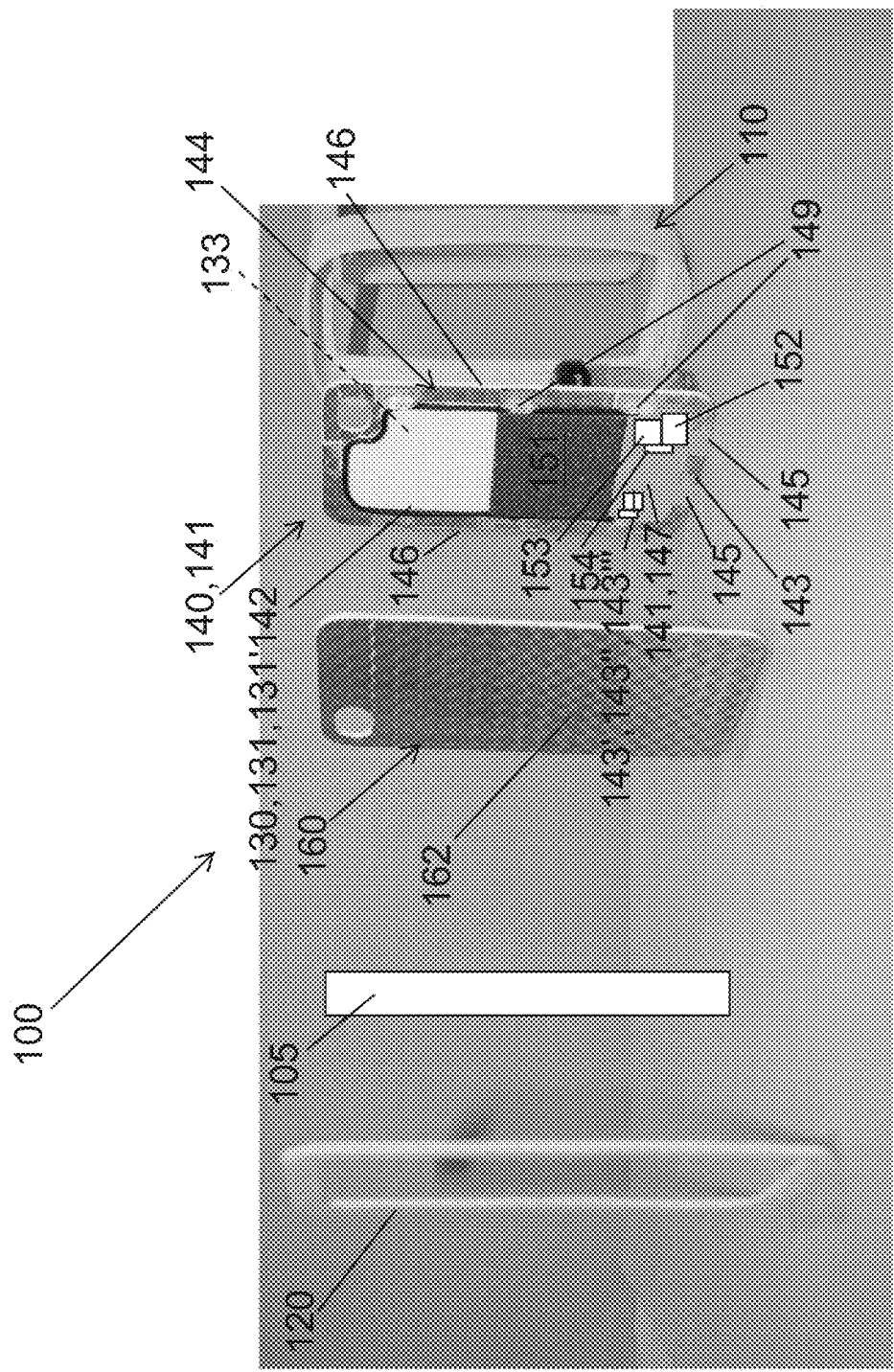
FIG. 1C illustrates an exploded side perspective view of an illuminated cell phone case, in accordance with one embodiment of the present invention.

FIG. 1C illustrates an exploded side perspective view of an illuminated cell phone case 100, in accordance with one embodiment of the present invention.

The illuminated cell phone case 100 includes illustrates and describes all of the similar elements of the illuminated cell phone case 100 that include the one piece bumper 110— with the front flange 120, the one or more LCD screens 130 or one or more LED screens 131, and the illuminated indicia 133 described and illustrated in FIG. 1A and FIG. 1B.

Additionally, the illuminated cell phone case 100 includes a liquid emitting diode or LED, printed circuit board or PCB and battery assembly 140 and a reflective cover 160. The LED, PCB and battery assembly 140 is generally planar rectangular shaped 141 and includes a front facing 142, a back facing 144 and a pair of perimeter sides 146. The front facing 142 includes a back portion 131' of the illuminated indicia 133, a printed circuit board 141, an activation switch 143 and a mini USB port 145. The printed circuit board 141 can receive one or more downloadable software applications 147 that can reside on the printed circuit board 141. The activation switch 143 includes an "on" setting, an "off" setting and an "auto" setting. The "on" setting activates the illuminated cell phone case 100, the "off" setting shuts-off the illuminated cell phone case 100 and the "auto" setting is in communication with a vibration switch 143' that activates the illuminated cellphone case 100 when a phone call, a text message or e-mail is received by the illuminated cell phone case 100. The LED, PCB and battery assembly 140 includes the vibration switch 143' and an audio sound sensor microphone 143", an electronic emissions sensor 143'" or any combination of the vibration switch 143', the audio sound sensor microphone 143" and the electronic emissions sensor 143'". The vibration switch 143', the audio sound sensor microphone 143" and the electronic emissions sensor 143'" are all one or more microprocessor chips within themselves. The mini USB port 145 serves as an inlet for a USB plug and a connection to a suitable battery charging and data transfer device. The back facing 144 includes the illuminated indicia 133 previously described in FIG. 1B and its description. The pair perimeter sides 146 include a plurality of LED lights 149 disposed on the pair of perimeter sides 146 of the LED, PCB and battery assembly 140. There are eight sets of the plurality of LED lights 149 illustrated on FIG. 1C on the perimeter sides 146 of the LED PCB and battery assembly 140, but the plurality of LED lights 149 can include the one or more liquid crystal display screens or LCD(s) 130, light emitting diode screens or LED(s) 131 or a plurality of any suitable number or sets of LED lights 149. The plurality of LED lights 149 can flash, blink, glow or perform any other suitable plurality of LED lights function. The plurality of LED lights 149, one or more liquid crystal display screens or LCD(s) 130 or light emitting diode screens or LED(s) 131 is controlled by the one or more software applications 147 that can reside on the printed circuit board 141.

The LED, PCB and battery assembly 140 also includes a battery 150 that is a lithium ion polymer battery 151 but can be any suitable battery. The battery 150 can also be rechargeable or disposable. The LED, PCB and battery assembly 140 and printed circuit board 141 also includes the one or more programmable microprocessors 152, the motion sensing chip 153, the vibration switch 143', the audio sound sensor microphone 143", and the electronic emissions sensor 143'". The one or more programmable microprocessors 152 run the one or more software applications 147 that reside on the printed circuit board 141. The motion sensing chip 153 activates the plurality of LED lights 149 when motion is detected by the illuminated cellphone case 100 and silently detects an incoming phone call, a text or an e-mail. The audio sound sensor microphone 143" or electronic emissions sensor 143'"also activates the plurality of LED lights 149 when motion is detected by the illuminated cellphone case 100 and also silently detects an incoming phone call, a text or an e-mail. The reflective cover 160 is placed in front of the LED, PCB and battery assembly 140 and reflects any light produced within the illuminated cell phone case 100. The reflective cover 160 is made of reflective tape 162 but can be any suitable reflective cover. The LED, PCB and battery assembly 140 and the reflective cover 160 are placed between the one piece bumper 110 and the front flange 120 forming the illuminated cell phone case 100. The cell phone 105 is placed between the reflective cover 160 and the front flange 120 forming protection for the cell phone 105 inside the illuminated cell phone case 100.

Figure 1D:
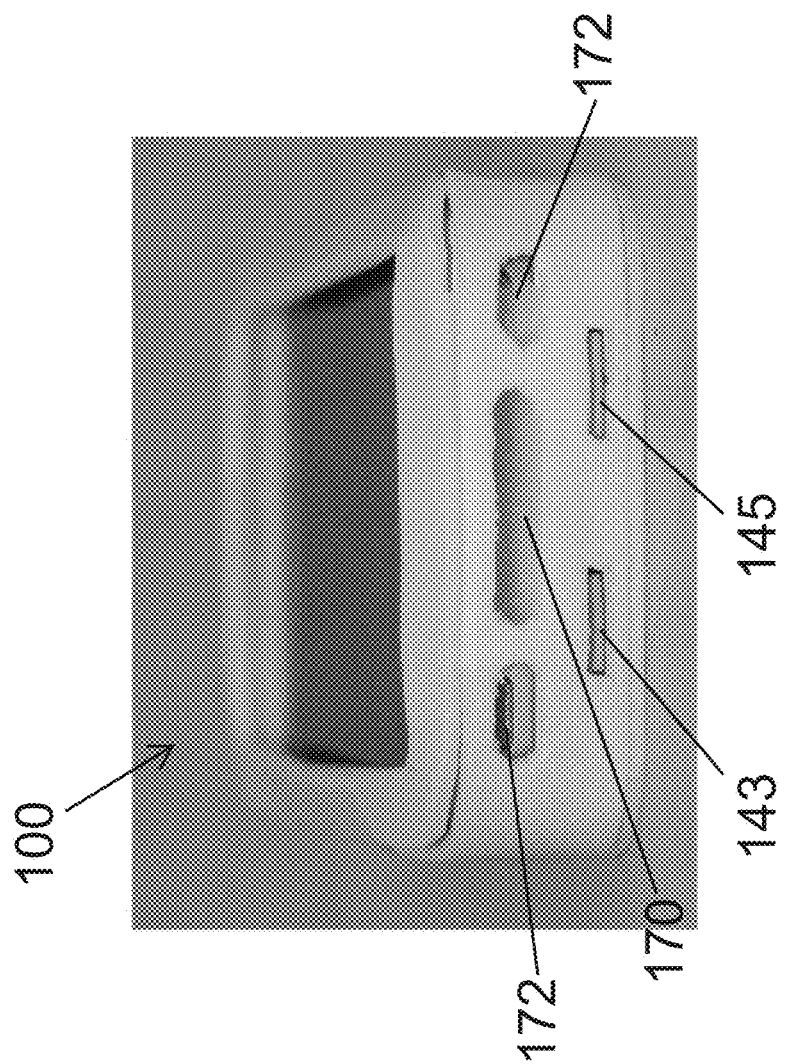
FIG. 1D illustrates a front perspective view of a bottom portion of an illuminated cell phone case, in accordance with one embodiment of the present invention.

FIG. 1D illustrates a front perspective view of a bottom portion 109 of an illuminated cellphone case 100, in accordance with one embodiment of the present invention.

FIG. 1D illustrates and describes all of the similar elements of the illuminated cell phone case 100 that include the one piece bumper 110 with front flange 120, the illuminated indicia 133, the PCB and battery assembly 140 and the reflective cover 160 as well as the activation switch 143 and the mini USB port 145 illustrated and described in previous FIGS. 1A, 1B and 1C. FIG. 1D additionally includes a plurality of IPhone cutouts to accommodate an IPhone's charging port 170 and a pair of speakers 172. The activation switch 143 and the mini USB port 145 can be positioned at any suitable location in the cellphone case 100.

Figure 1E:
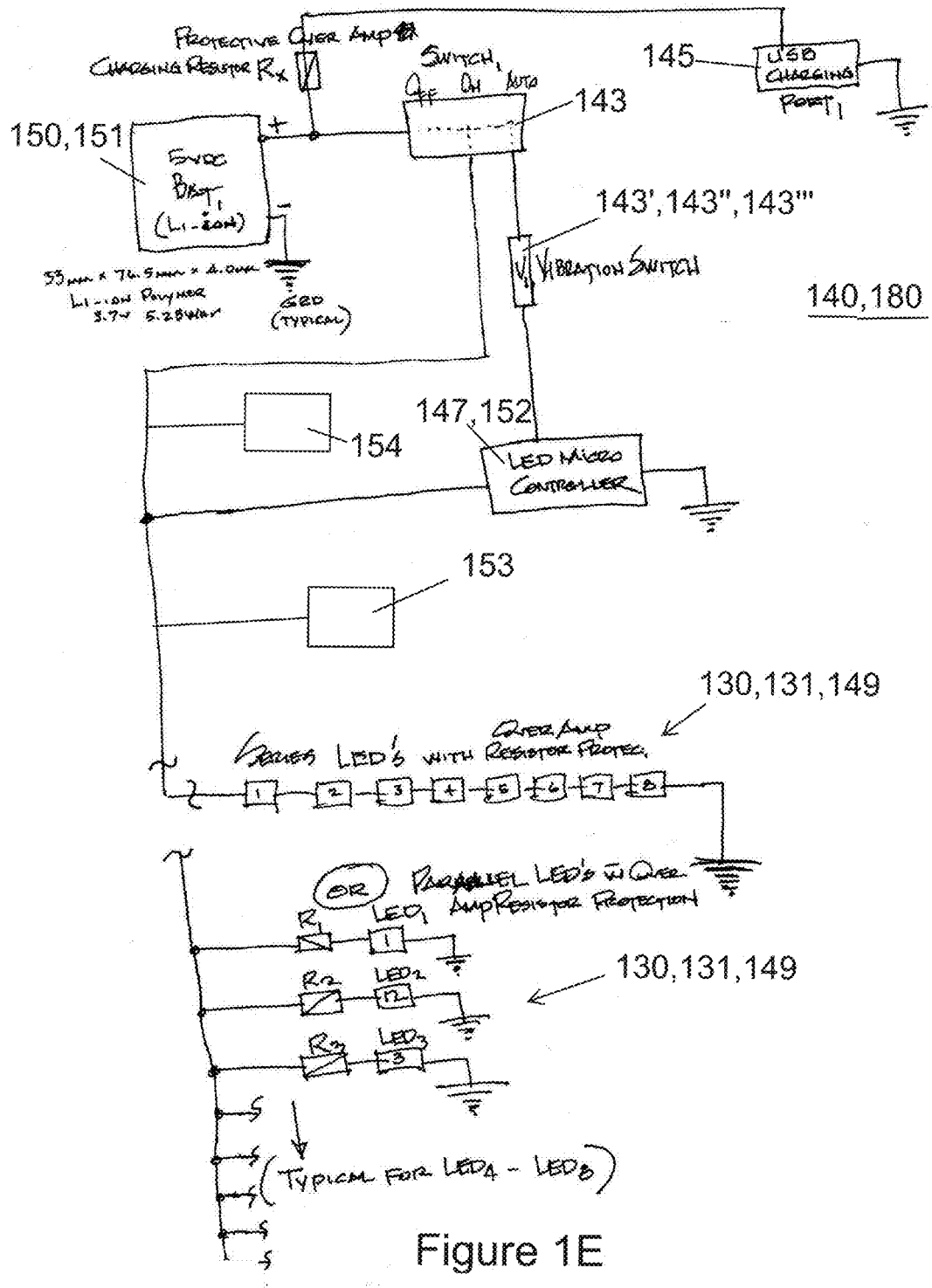
FIG. 1E illustrates an electrical diagram of an illuminated cell phone case, in accordance with one embodiment of the present invention.

FIG. 1E illustrates an electrical diagram 180 of an illuminated cell phone case 100, in accordance with one embodiment of the present invention.

The electrical diagram 180 includes the USB mini port 145, the activation switch 143, the battery 150, the one or more programmable microprocessors 152, the motion sensing chip 153, the audio sound sensor microphone 143", the electrical emissions sensor 143'", the LED, PCB and battery assembly 140, the one or more software applications 147 and the vibration switch 143' described and illustrated in FIGS. 1A, 1B, 1C and 1D. FIG. 1D additionally includes the plurality of LED lights 149, the one or more liquid crystal display screens or LCD(s) 130 or light emitting diode screens or LED(s) 131.

The illuminated cellphone case silently identifies incoming calls, texts and e-mails by illuminating a plurality of LED style lights. Cell phone user does not need to have the ringer turned on to know when there is an incoming call, text or e-mail. The case back, sides, top, bottom and front edges (i.e., the front rim edge) lights up in a variable and programmable LED style solid burn, flashing, chasing or patterned lights. When an incoming call, text or e-mail is received the LED style lights light up in solid burn, flashing, chasing or patterned lights depending on the programming of the programmable chip. The user can set the case switch to ON, OFF or AUTO. In ON position the LED lights are all illuminated. In the OFF position the LED array is prevented from coming on. In AUTO position the case detects incoming calls, text or e-mail by the phones' vibrating motion or by the user's motion when moving the phone. The user can select ON, OFF or AUTO at any time to control the LED array. The cell-phone protective case that allows a consumer to select various customized appearances for the display of the LED lights.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:
1. An illuminated cellphone case, comprises:
   a one piece bumper that surrounds a perimeter of a cell phone, said one piece bumper protects said cell phone from damage;
   a front flange placed in front of said one piece bumper, said front flange surrounds said perimeter of said cell phone to provide additional protection to a front perimeter portion of said cell phone;
   an illuminated indicia that is disposed on a back portion of said illuminated cellphone case and that displays an illuminated logo on one or more Light-Emitted Diode (LED) screens or one or more Liquid-Crystal Display (LCD) screens;

a generally planar rectangular shaped LED, Printed Circuit Board (PCB), and battery assembly that includes a front facing, a back facing, and a pair of perimeter sides, said generally planar rectangular shaped LED, PCB, and battery assembly includes a plurality of LED lights;

one or more programmable microprocessors that controls said plurality of LED lights;

an activation switch that includes an on position, an off position, and an auto position; and a battery that provides power to said illuminated cellphone case;

when said activation switch is in said auto position, the one or more programmable microprocessors silently identifies incoming calls, text messages, or e-mails received by said illuminated cellphone case by illuminating the plurality of LED lights in a variable or programmable style.

2. The illuminated cellphone case according to claim 1, wherein said one piece bumper is made of injection molded silicone.

3. The illuminated cellphone case according to claim 1, wherein said front flange is made of injection molded silicone.

4. The illuminated cellphone case according to claim 1, wherein said front facing includes a back portion of said illuminated indicia, a printed circuit board, said activation switch and said mini USB port.

5. The illuminated cellphone case according to claim 1, wherein said printed circuit board receives one or more downloadable software applications.

6. The illuminated cellphone case according to claim 1, wherein said back facing includes said illuminated indicia.

7. The illuminated cellphone case according to claim 1, wherein said pair of perimeter sides includes said plurality of LED lights.

8. The illuminated cellphone case according to claim 1, wherein said plurality of LED lights flash, blink and glow.

9. The illuminated cellphone case according to claim 1, wherein said LED, PCB and battery assembly includes one or more LCD screens.

10. The illuminated cellphone case according to claim 9, wherein said one or more one or more programmable microprocessors control said one or more LCD screens.

11. The illuminated cellphone case according to claim 1, wherein said LED, PCB and battery assembly includes one or more LED screens.

12. The illuminated cellphone case according to claim 11, wherein said one or more one or more programmable microprocessors control said one or more LED screens.

13. The illuminated cellphone case according to claim 1, wherein said LED, PCB and battery assembly includes one or more audio sound outputs.

14. The illuminated cellphone case according to claim 13, wherein said one or more one or more programmable microprocessors control said one or more audio sound outputs.

15. The illuminated cellphone case according to claim 1, wherein said activation switch in said auto position is in communication with said one or more programmable microprocessors when a phone call, a text message or e-mail is received by said illuminated cellphone case.

16. The illuminated cellphone case according to claim 15, wherein said vibration switch is activated when motion is detected by said illuminated cellphone case, said vibration switch silently detects said incoming phone call, said incoming text or said incoming e-mail.

17. The illuminated cellphone case according to claim 15, wherein an audio sound sensor microphone is activated when motion is detected by said illuminated cellphone case, said audio sound sensor microphone silently detects said incoming phone call, said incoming text or said incoming e-mail.

18. The illuminated cellphone case according to claim 15, wherein an electronic emissions sensor is activated when motion is detected by said illuminated cellphone case, said electronic emissions sensor silently detects said incoming phone call, said incoming text or said incoming e-mail.

19. The illuminated cellphone case according to claim 1, wherein said battery is a lithium battery.

20. The illuminated cellphone case according to claim 19, wherein said battery is a lithium ion polymer battery.

* * * * *